(12) United States Patent
Noe-Hays et al.

(10) Patent No.: US 11,897,822 B2
(45) Date of Patent: Feb. 13, 2024

(54) RECIPROCATING FREEZE CONCENTRATION FOR URINE-BASED FERTILIZER PRODUCTION

(71) Applicant: The Regents of the University of Michigan, Ann Arbor, MI (US)

(72) Inventors: Abraham Noe-Hays, Putney, VT (US); Nancy G. Love, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 394 days.

(21) Appl. No.: 17/093,123

(22) Filed: Nov. 9, 2020

(65) Prior Publication Data

US 2021/0139385 A1 May 13, 2021

Related U.S. Application Data

(60) Provisional application No. 62/932,104, filed on Nov. 7, 2019.

(51) Int. Cl.
*C05C 3/00* (2006.01)
*B01D 9/00* (2006.01)
*C01C 1/10* (2006.01)

(52) U.S. Cl.
CPC .............. *C05C 3/00* (2013.01); *B01D 9/0013* (2013.01); *C01C 1/10* (2013.01)

(58) Field of Classification Search
None
See application file for complete search history.

(56) References Cited

U.S. PATENT DOCUMENTS

| 2005/0050917 A1 | 3/2005 | Kagitani |
| 2010/0071446 A1 | 3/2010 | Brown |

(Continued)

FOREIGN PATENT DOCUMENTS

| CN | 108910997 A | * 11/2018 | ............... C02F 1/06 |
| WO | 2006003968 A1 | 1/2006 | |
| WO | WO 2006/003968 | * 1/2006 | ............... C02F 1/22 |

OTHER PUBLICATIONS

Arquiza et al., "Studies on the Use of Conductive Porous Media Distillation and Thermoelectric Freeze-Concentration for Water Recovery in Space Exploration", 44th International Conference on Environmental Systems, Jul. 2014, 17 pages.

(Continued)

*Primary Examiner* — Wayne A Langel
(74) *Attorney, Agent, or Firm* — Lempia Summerfield Katz LLC

(57) ABSTRACT

A system for generating a concentrated product from a feedstock includes a reciprocating concentration system that includes first and second chambers to which the feedstock is alternately provided and from which the concentrated product is alternately removed, and a heat transfer system in thermal communication with the first and second chambers, the heat transfer system being configured to reversibly transfer heat between the first and second chambers such that the first chamber alternates between melting a frozen portion of the feedstock in the second chamber and having a frozen portion of the feedstock in the first chamber melted by the feedstock in the second chamber. The system further includes a heat dump system in thermal communication with the reciprocating concentration system, the heat dump system being configured to remove heat from the reciprocating concentration system.

12 Claims, 7 Drawing Sheets

(56) References Cited

U.S. PATENT DOCUMENTS

2010/0108294 A1   5/2010   Feldmann
2011/0229870 A1   9/2011   Seidel

OTHER PUBLICATIONS

Gulyas et al., "Freeze Concentration for Enrichment of Nutrients in Yellow Water from No-Mix Toilets", Water Science and Technology, 2004, pp. 61-68, vol. 50, No. 6.
International Preliminary Report on Patentability in International Patent Application No. PCT/US2019/046660, dated Feb. 16, 2021, 7 pages.
International Search Report and Written Opinion in corresponding PCT application No. PCT/US2019/046660, dated Dec. 4, 2019, 10 pages.
Maurer et al., "Treatment Processes for Source-Separated Urine", Water Research, 2006, pp. 3151-3166.

\* cited by examiner

RECIPROCATING FREEZE CONCENTRATION FOR URINE-BASED FERTILIZER PRODUCTION

CROSS-REFERENCE TO RELATED APPLICATION

This application claims the benefit of U.S. provisional application entitled "Reciprocating Freeze Concentration for Urine-Based Fertilizer Production," filed Nov. 7, 2019, and assigned Ser. No. 62/932,104, the entire disclosure of which is hereby expressly incorporated by reference.

STATEMENT REGARDING FEDERALLY SPONSORED RESEARCH OR DEVELOPMENT

This invention was made with government support under Contract No. CBET1639244 awarded by the National Science Foundation (NSF). The government has certain rights in the invention.

BACKGROUND OF THE DISCLOSURE

Field of the Disclosure

The disclosure relates generally to the production of urine-based fertilizer and other concentrated products.

Brief Description of Related Technology

A human adult typically produces approximately 150 gallons of urine each year. This urine contains a significant amount of nutrients for fertilizer. But the large volume of the urine makes it difficult to store and transport to farms where the nutrients can be used, especially if urine is collected in cities far from agricultural areas.

A variety of procedures have been used to remove water from urine and thereby reduce its volume to create a concentrated product. These procedures include distillation, evaporation, freeze/thaw, and reverse osmosis. Some of the procedures, such as reverse osmosis, may have a higher energy efficiency than others. But reverse osmosis has one major drawback. The nitrogen in stored in urine is largely in the form of ammonia. Only a portion of the ammonia is able to pass through a membrane of the reverse osmosis procedure. A substantial amount of the nitrogen is therefore lost rather retained in the concentrate.

SUMMARY OF THE DISCLOSURE

In accordance with one aspect of the disclosure, a system for generating a concentrated product from a feedstock includes a reciprocating concentration system that includes first and second chambers to which the feedstock is alternately provided and from which the concentrated product is alternately removed, and a heat transfer system in thermal communication with the first and second chambers, the heat transfer system being configured to reversibly transfer heat between the first and second chambers such that the first chamber alternates between melting a frozen portion of the feedstock in the second chamber and having a frozen portion of the feedstock in the first chamber melted by the feedstock in the second chamber. The system further includes a heat dump system in thermal communication with the reciprocating concentration system, the heat dump system being configured to remove heat from the reciprocating concentration system.

In accordance with another aspect of the disclosure, a method of generating a concentrated product from a feedstock includes providing the feedstock to a first chamber of a reciprocating concentration system, transferring, with a heat transfer system of the reciprocating concentration system, heat from the first chamber to a second chamber of the reciprocating concentration system to melt a frozen portion of the feedstock in the second chamber and freeze the feedstock in the first chamber, the heat transfer system being in thermal communication with the first and second chambers, removing the concentrated product and at least one dilute product from the second chamber as the frozen portion of the feedstock in the second chamber melts, removing heat from the reciprocating concentration system with a heat dump system in thermal communication with the reciprocating concentration system, and switching a heat transfer direction of the heat transfer system to reverse operation of the reciprocating concentration system in preparation for freezing additional feedstock provided to the second chamber.

In connection with any one of the aforementioned aspects, the systems, devices, and/or methods described herein may alternatively or additionally include any combination of one or more of the following aspects or features. The heat dump system is in thermal communication with one of the first and second chambers or in alternating thermal communication with both of the first and second chambers. The heat dump system is in thermal communication with the heat transfer system. The system further includes insulation disposed between a heat sink of the heat dump system and the reciprocating concentration system. The heat dump unit includes a thermoelectric heat pump and a heat sink in thermal communication with the thermoelectric heat pump. The heat transfer system includes a heat pump. The heat transfer system further includes first and second pairs of thermal transfer channels in thermal communication with the first and second chambers, respectively, each thermal transfer channel passing through the heat pump. The heat pump includes a thermoelectric heat pump. The heat transfer system includes first and second thermally conductive blocks adjacent to the first and second chambers, respectively, and a Peltier cell disposed between the first and second thermally conductive blocks. The heat transfer system includes a heat pump disposed between the first and second chambers, and cooling and warming shells adjacent the first and second chambers, each of the cooling and warming shells carrying a respective thermal transfer fluid. The cooling shell is disposed along a respective upper portion of the first and second chambers such that the feedstock freezes from the upper portion downward. The warming shell is disposed along a respective lower portion of the first and second chambers such that the feedstock melts from the lower portion upward. The first and second chambers are disposed in an inclined orientation. The reciprocating concentration system further includes a third chamber to which the feedstock is provided and from which the concentrated product is removed. The heat transfer system in thermal communication with the third chamber such that the feedstock in the third chamber melts and freezes out of phase relative to both the first and second chambers. Removing the heat with the heat dump system is implemented concurrently with transferring the heat with the heat transfer system. Removing the heat with the heat dump system is implemented before transferring the heat with the heat transfer system. Removing the heat with the heat dump system includes circulating a heat transfer fluid through the first chamber. Removing the heat with the heat dump system includes circulating a heat transfer fluid between a heat pump of the heat transfer system and a heat sink of the heat dump system. Transferring the heat with the heat transfer system includes pumping thermal transfer fluids through shells adjacent the first and second chambers. Transferring the heat with the heat transfer system includes operating a thermoelectric heat pump.

BRIEF DESCRIPTION OF THE DRAWING FIGURES

For a more complete understanding of the disclosure, reference should be made to the following detailed description and accompanying drawing figures, in which like reference numerals identify like elements in the figures.

Figure 1:
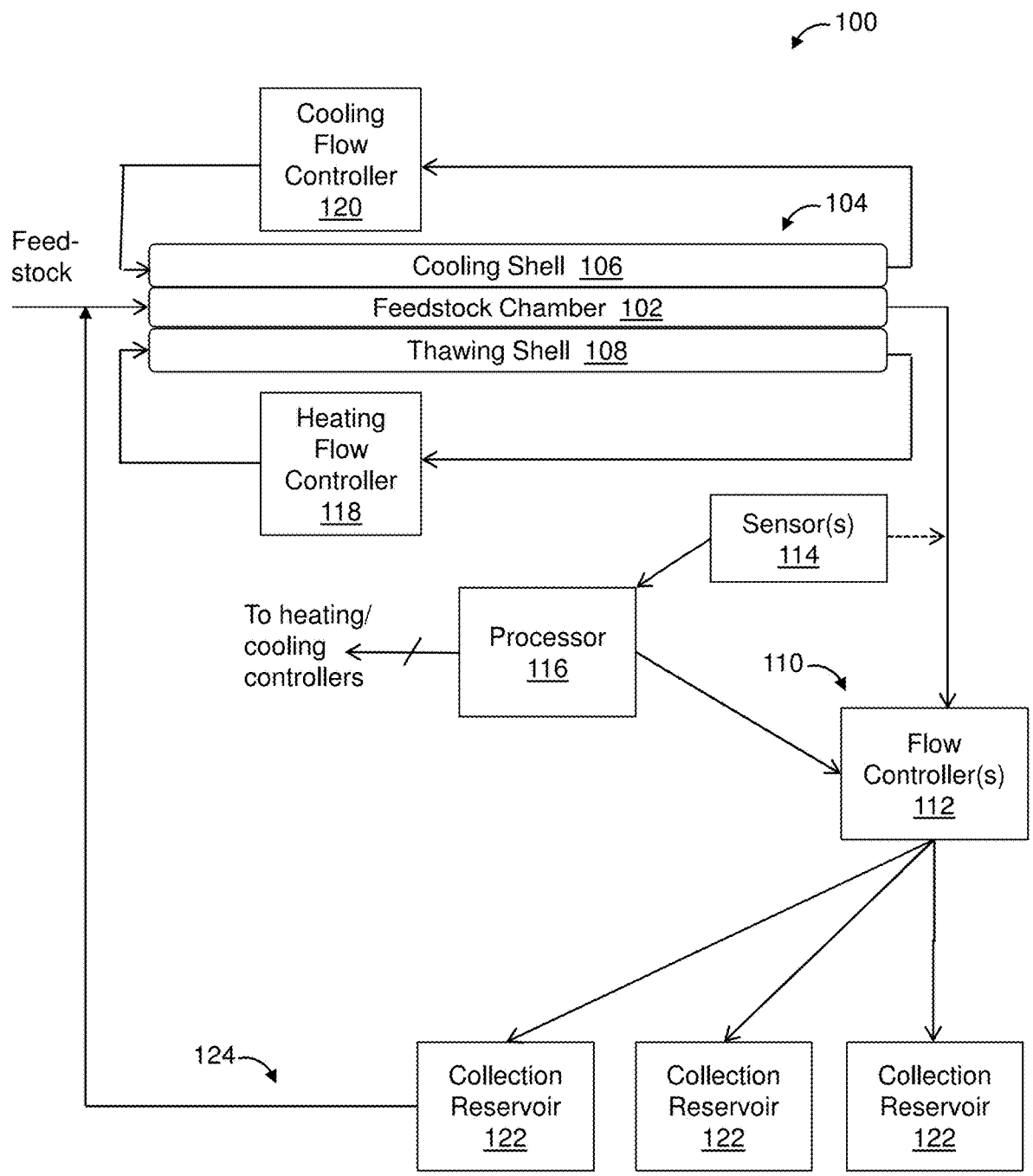
FIG. 1 is a block diagram of a system for generating a concentrated product from a urinary feedstock in accordance with one example.

The embodiments of the disclosed systems, assemblies, and methods may assume various forms. Specific embodiments are illustrated in the drawing and hereafter described with the understanding that the disclosure is intended to be illustrative. The disclosure is not intended to limit the invention to the specific embodiments described and illustrated herein.

DETAILED DESCRIPTION OF THE DISCLOSURE

Systems, heat exchanger assemblies, and methods for generating a concentrated product from a urinary feedstock are described. The disclosed systems and methods remove water from the urinary feedstock (e.g., urine or urine-derived liquid feedstock) by partially or completely freezing the feedstock, then removing (e.g., draining off) a fraction of the feedstock as a concentrated product. The concentrated product may correspond with the fraction of the feedstock that remained after the freezing stage is completed. The concentrated product may alternatively or additionally correspond with a fraction of the liquid first produced during thawing. During operation, a plurality of products at different concentration levels are defined as the urinary feedstock thaws.

The concentration levels of the liquid products of the disclosed systems, assemblies, and methods may be established through sensing a characteristic of the liquid and/or a heat exchanger assembly. The characteristic is indicative of the concentration level of the product. For instance, the remaining or otherwise produced liquid may pass through or by, or is otherwise analyzed by one or more sensors, such as a conductivity sensor, to determine a solute concentration level of the liquid. As described below, various types of sensors may be used, including, for instance, a color sensor, an opacity sensor, a temperature sensor (e.g., thermometer), a float sensor, a conductivity sensor, or a flow sensor. Thus, the characteristic (e.g., conductivity, temperature, volume, etc.) measured by the sensor(s) may vary accordingly, while still being indicative of solute concentration level. Still other types of sensors may indirectly measure a characteristic of the produced liquid. For example, the heat flux through the heat exchanger assembly, or the temperature of the remaining ice or the feedstock chamber walls, may provide an indication of the present concentration level.

The produced liquid may be directed through an output flow arrangement using the measured characteristic and, thus, concentration level, as a controlling parameter. The output flow arrangement is configured to define the multiple products. For instance, the produced liquid may be selectively directed to one of a plurality of containers or other output paths, one container or output path at a time as the concentration level lowers over time. Controlling the direction of the liquid may thus produce liquid fractions of differing concentration levels in each of the containers.

In some cases, the urinary feedstock is frozen, e.g., partially frozen, by a heat exchanger assembly in thin ice sheets or blocks. In some cases, the heat exchanger assembly includes one or more shells stacked adjacent to the feedstock chamber for thermal transfer therewith. The thickness of the ice sheet may be less than about one-fifth of its length or width, such as about one-tenth. A variety of shapes and dimensions may be used. For example, the heat exchanger assembly may be configured as or otherwise include a heat sink having a number of thermal transfer fins or other elements configured for disposition within the feedstock chamber, thereby defining a number of thin spaces within the feedstock chamber.

In some cases, the urinary feedstock is frozen in a sheet or block oriented in a horizontal or inclined position, with the heat being removed from the upward-facing surface. The frozen urine may additionally or alternatively be thawed while disposed at an incline (e.g., on an inclined surface), such that liquid is drained by gravity.

Although described in connection with heat exchanger assemblies having shells arranged in a stacked configuration with the feedstock chamber, the disclosed systems and methods are useful in connection with a wide variety of heat exchanger configurations. For instance, the manner in which heat is removed for freezing, and/or added for thawing, may vary. Various types of heat exchanger assemblies may thus be used in conjunction with the sensor-based measurement(s) to control production.

FIG. 1 depicts a system 100 for generating a concentrated product from a urinary feedstock in accordance with one example. The system 100 includes a feedstock chamber 102 to which the feedstock is provided, and a heat exchanger assembly 104 (or freeze concentration assembly) in thermal communication with the feedstock chamber 102. The heat exchanger assembly 104 is configured to freeze the urinary feedstock in the feedstock chamber 102. In some cases, the heat exchanger assembly 104 includes a number of compartments or other chambers for circulation of one or more thermal transfer fluids. In this case, the assembly includes two thermal transfer fluid chambers 106, 108 on opposite sides of the feedstock chamber 102. The thermal transfer fluid chambers 106, 108 are configured as, or otherwise include, a cooling chamber 106 and a heating chamber 108. Any number of feedstock chambers 102 and/or heat exchanger assemblies 104 may be included, e.g., for operation in parallel.

Walls and/or other aspects of the feedstock chamber 102 and the thermal transfer fluid chambers 106, 108 may be configured to facilitate heat transfer to or from the feedstock chamber 102. For instance, one or more of the feedstock chamber 102 and the thermal transfer fluid chambers 106, 108 may have one or more walls or other components composed of (or otherwise including) sheet metal. Alternatively or additionally, the feedstock chamber 102 may be or include a flexible bag, such as a bag composed of a polyester film. Other types of films or membranes may be used. The flexibility may be useful to allow for thermal expansion during freezing. Any material(s) that prevent liquid from flowing from one chamber into another, but allow the flow of heat from one chamber to another through the chamber wall, may be used.

Figure 2:
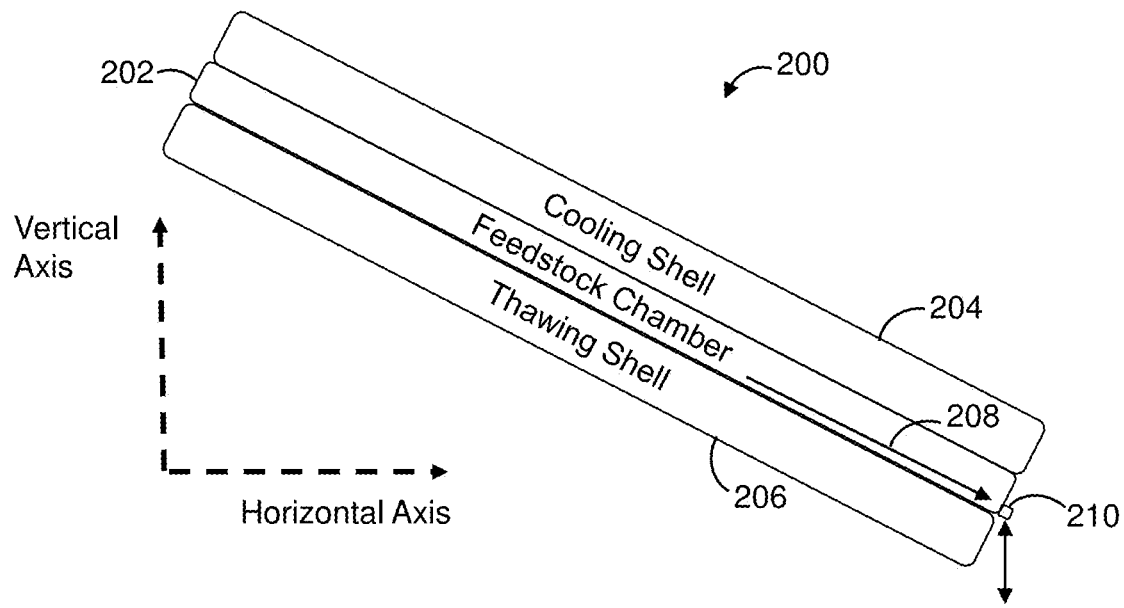
FIG. 2 is a schematic view of a heat exchanger assembly for use in generating a concentrated product from a urinary feedstock in accordance with one example.

As shown in FIGS. 1 and 2, the feedstock chamber 102 and the thermal transfer fluid chambers 106, 108 may be disposed in a stacked arrangement. For example, the feedstock chamber 102 and the heat exchanger assembly 104 may be arranged as stacked shells or plates.

The feedstock chamber 102 and the thermal transfer fluid chambers 106, 108 may be operated or configured as alternating "freeze chambers" and "heat exchange chambers". The freeze chambers 102 are filled with urinary feedstock (e.g., urine or processed urine material), while the heat exchange chambers 106, 108 are configured for circulation of a heat-transfer fluid or liquid, such as glycol. Alternative or additional liquids or fluids may be used for heat transfer. For example, the heat transfer fluid may be or include water or air.

In one example, during a freezing phase, heat moves from the feedstock in the feedstock (or freeze) chambers 102 into the heat-transfer fluid in the heat exchange chamber 106, resulting in the feedstock chilling to below the freezing point and the formation of ice crystals within the feedstock. Alternatively, heat is removed by the heat-transfer fluid in both of the heat exchange chambers 106, 108. In some cases, once a desired degree of freezing of the feedstock has been attained, any remaining free liquid contains a high concentration of solutes and is drained off or otherwise removed as one product (e.g., a concentrated product) of the system 102. Then warm (e.g., above freezing point) heat-transfer liquid is circulated through one or both of the heat exchange chambers 106, 108, transferring heat to the frozen portion (e.g., the ice crystals) of the feedstock in the freeze chamber 102, causing the frozen portion of the feedstock to melt.

The first liquid to drain from the melting process (as well as any free liquid that failed to freeze in some cases) is highly concentrated relative to the original feedstock. As the frozen portion of the feedstock continues to melt, the solute concentration decreases. As the concentration of the melting liquid changes, the resulting fractions are diverted to a series of containers or other output paths (e.g., for secondary processes). For example, the thawed liquid may be separated into three fractions or products: 1) a concentrated product fraction, 2) a fraction with concentration similar to the feedstock, which is recycled into another freeze cycle, and 3) a low-concentration fraction that is directed to disposal or recycled for other uses. Additional, fewer, or alternative fractions or products may be produced. For example, multiple concentrated products of different concentration levels may be produced.

The system 100 may include multiple sets of alternating feedstock chambers 102 and thermal transfer fluid exchange chambers 106, 108. The feedstock chambers 102 and the thermal transfer fluid exchange chambers 106, 108 may be constructed or otherwise configured as an integrated block. Alternatively, the feedstock chambers 102 and the thermal transfer fluid exchange chambers 106, 108 may be discrete components that may be coupled and decoupled in a modular way.

Additional, fewer, or alternative thermal transfer fluid chambers 106, 108 may be used. For example, a single thermal transfer fluid chamber may be used for both cooling and heating. In other cases, thermal transfer (e.g., thawing) may be provided in a way not involving a thermal transfer fluid chamber (e.g., via the ambient or another mechanism).

The system 100 further includes an output flow arrangement 110 configured to carry liquid from the feedstock chamber 102 as the urinary feedstock thaws. The output flow arrangement 110 includes one or more flow controllers 112. In the example of FIG. 1, the flow controller 112 is coupled to the feedstock chamber 102 via a pipe or tube. In other cases, the flow path between the feedstock chamber 102 and the flow controller 112 includes further tubing and/or other elements.

The system 100 further includes one or more sensors 114 and a system controller 116 to control the operation of various components of the system 100. Each sensor 114 is configured to measure a characteristic of the liquid or the heat exchanger assembly 104. The characteristic is indicative of a solute concentration level of the liquid. Each sensor 114 is disposed along the output flow arrangement 110 upstream of the flow controller 112. For example, the sensor 114 may be immersed or disposed within the output flow. In such cases, the sensor 114 may be or include a conductivity sensor or a thermometer. The location, type, and other characteristics of the sensor(s) may vary. For instance, the sensor 114 may be or include an optical sensor adjacent the output flow. Alternative or additional characteristics of the liquid or the heat exchanger assembly 104 may be sensed, including, for instance, the volume or flow rate of the liquid, or heat flux through one or more components of the system (e.g., one of the shells). In some cases, the heat flux may be measured by sensing the flow rate of the thermal transfer fluid and/or the temperature difference in the thermal transfer fluid as it flows into and out of thermal transfer fluid chamber. The sensor(s) 114 associated with such characteristics accordingly may or may not be exposed to the liquid. A sensor not in contact with the liquid may be more robust. In contrast, sensors exposed to the liquid may involve routine cleaning or other maintenance, or replacement due to, for instance, corrosion.

The system controller 116 is responsive to the characteristic measured by the sensor(s) 114. The system controller 116 is configured to control the flow controller 112 to select a respective output path of the output flow arrangement based on the solute concentration level. The system controller 112 may also use the solute concentration level to regulate or otherwise control the flow(s) of thermal transfer fluid(s) to the thermal transfer fluid chamber(s) 106, 108 via one or more additional flow controllers. In the example of FIG. 1, the system 100 includes a heating flow controller 118 and a cooling flow controller 120. The degree to which, and/or the rate at which, the feedstock freezes or thaws may thus be controlled. Additional parameters may be processed by the system controller 116 to select the output path and/or regulate the thermal transfer fluid flow.

The system controller 116 is or includes one or more processors configured to generate control signals for the flow controllers. In the example of FIG. 1, the system controller 116 includes a single processor, such as a field programmable gate array. Other types of processors may be used, including, for instance, various types of microcontrollers and microprocessors. The processors may be components of an automated control system. The control system may provide functionality in addition to managing the flows of liquid and heat. For instance, the control system may provide or support remote data logging and other operational management. In some cases, data pertaining to the temperature, rate of freezing or thawing, rate of liquid production, temperature of drained liquid, conductivity of drained liquid, and other measures are read and logged periodically, and are uploaded to the internet or cloud service in a way that makes the data accessible remotely. Operation during the freezing and thawing phases may be monitored and controlled remotely, such as through the internet.

The processor(s) of the system controller 116 is/are configured to control the flow controller 112 to, based on the solute concentration level, direct the liquid passing through the output flow arrangement 110 to define a plurality of products at different concentration levels. In the example of FIG. 1, the output flow arrangement 110 includes a plurality of containers (e.g., collection reservoirs) 122. The fractions of the thawed liquid are directed to the different containers 122 of the flow by the flow controller(s) 112 to define the products.

The configuration and other characteristics of the flow controller(s) 122 and the output flow arrangement 110 for directing the thawed liquid may vary. For example, each flow controller 122 may include one or more pumps (e.g., peristaltic pumps) and/or one or more valves. In one example, a single peristaltic pump of a bank of pumps may be activated at a time, with a different pump corresponding with each storage container 122. Alternatively or additionally, the flow controller 112 may involve opening a single valve of a bank of valves at a time. In other cases, multiple pumps, valves, and/or other flow control elements may be operational concurrently.

The system 100 includes a recycle or return path 124 from one of the containers 122 to return one of the products to the feedstock chamber 102. The return path 124 may include a valve for integrating the recycled feedstock with an input line of the system 100. The valve may be controlled by the processor of the system controller 116 and/or another processor.

FIG. 2 depicts a heat exchanger assembly 200 in accordance with one example. The heat exchanger assembly 200 is configured as a stacked arrangement with a feedstock chamber 202. The heat exchanger assembly 200 may be used in the system 100 of FIG. 1 or another system.

The heat exchanger assembly 200 and the feedstock chamber 202 may be similar to the example shown in FIG. 1 in several aspects. For instance, the heat exchanger assembly 200 may include a cooling chamber 204 disposed adjacent to, or along, an upper side of the feedstock chamber 202 such that delivery of a cooling fluid to the cooling chamber 204 freezes the urinary feedstock from top to bottom within the feedstock chamber 202. The heat exchanger assembly 200 may also include a heating chamber 206 disposed adjacent to, or along, a lower side of the feedstock chamber 202 such that delivery of a heating fluid to the heating chamber 206 thaws the urinary feedstock from the bottom to the top within the feedstock chamber 202. In the example of FIG. 2, the cooling and heating chambers 204, 206 are configured as respective shells, but other configurations may be used. For instance, the thermal transfer elements of the heat exchanger assembly 200 may be configured as, or otherwise include, fins, tubes, coils, plates, and/or other components.

In the example of FIG. 2, the stacked arrangement of the feedstock chamber 202 and the cooling and heating chambers 204, 206 is disposed in an inclined orientation. As a result of the inclined orientation, the liquid drains out of the feedstock chamber 202 as the feedstock thaws. For example, the liquid may drain in a direction 208 as shown. The inclined orientation is depicted in FIG. 2 relative to vertical and horizontal axes. Each chamber 202, 204, 206 is oriented at an angle relative to the vertical and horizontal axes, as shown. The angle may vary. In other cases, the stacked arrangement is oriented vertically.

The inclined or vertical orientation may facilitate the removal of the thawed liquid. The thawed liquid may drain or flow downward toward one or more output ports 210 of the feedstock chamber 202. In the example of FIG. 2, the output port 210 is positioned at or along a lower edge of the feedstock chamber 202 as shown.

Figure 3:
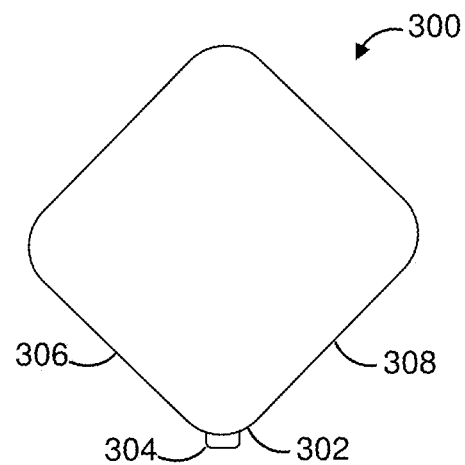
FIG. 3 is a schematic, elevational view of a feedstock chamber oriented and configured in accordance with one example.

FIG. 3 is an elevational view of a feedstock chamber 300 in accordance with one example. The feedstock chamber 300 may be used in the system 100 of FIG. 1 or another system, and/or in connection with the heat exchanger assembly 200 of FIG. 2 or another heat exchanger assembly. In this example, the feedstock chamber 300 is oriented such that a corner 302 of the chamber 300 is disposed at a low point in order to aid the flow of the thawed liquid into to one or more ports 304 located at the corner 302. Lower edges 306, 308 of the feedstock chamber 302 may be inclined relative to the horizontal axis as shown. The other chambers of the heat exchanger assembly (e.g., the cooling and heating chambers 204, 206 of the assembly 200 of FIG. 2) may be similarly oriented.

FIG. 3 depicts an example in which the feedstock chamber 300 includes a single port for both inflow and outflow. In such cases, charging and draining of the feedstock is achieved using the same port. In other cases, the feedstock chamber 300 may include multiple ports. For instance, the feedstock chamber 300 may include an inlet port and an outlet port. The outlet ports may be disposed along a lower edge of the feedstock chamber 300.

The number of ports may vary from the examples shown. For instance, one or more ports may be used for charging the feedstock chamber, and one or more ports may be used for draining the feedstock chamber. The port(s) used for outflow or draining may or may not be located at a bottom corner or other lower location of the chamber.

One or more elements of the above-described examples may not be stationary during operation. For instance, a stacked arrangement of a feedstock chamber and a thermal fluid transfer chamber may be tilted or flipped over after the freezing phase is completed. Once in the new orientation, the thermal fluid transfer chamber (or other cooling element) moves to the bottom of the feedstock chamber, e.g., for use as a heating shell. The heat exchanger assembly may accordingly include only a single thermal fluid transfer chamber or other element for both cooling (e.g., when above the feedstock chamber) and heating (e.g., when below the feedstock chamber). Alternative or additional operational aspects may also be non-stationary. For example, the feedstock chamber may also be flipped back and forth or otherwise shaken or agitated during the cooling and freezing process in order to, for instance, keep the contents of the feedstock chamber mixed, and/or encourage early initiation of crystallization. Such crystallization may help avoid supercooling followed by flash freezing, which may adversely affect the performance of the system.

Figure 4:
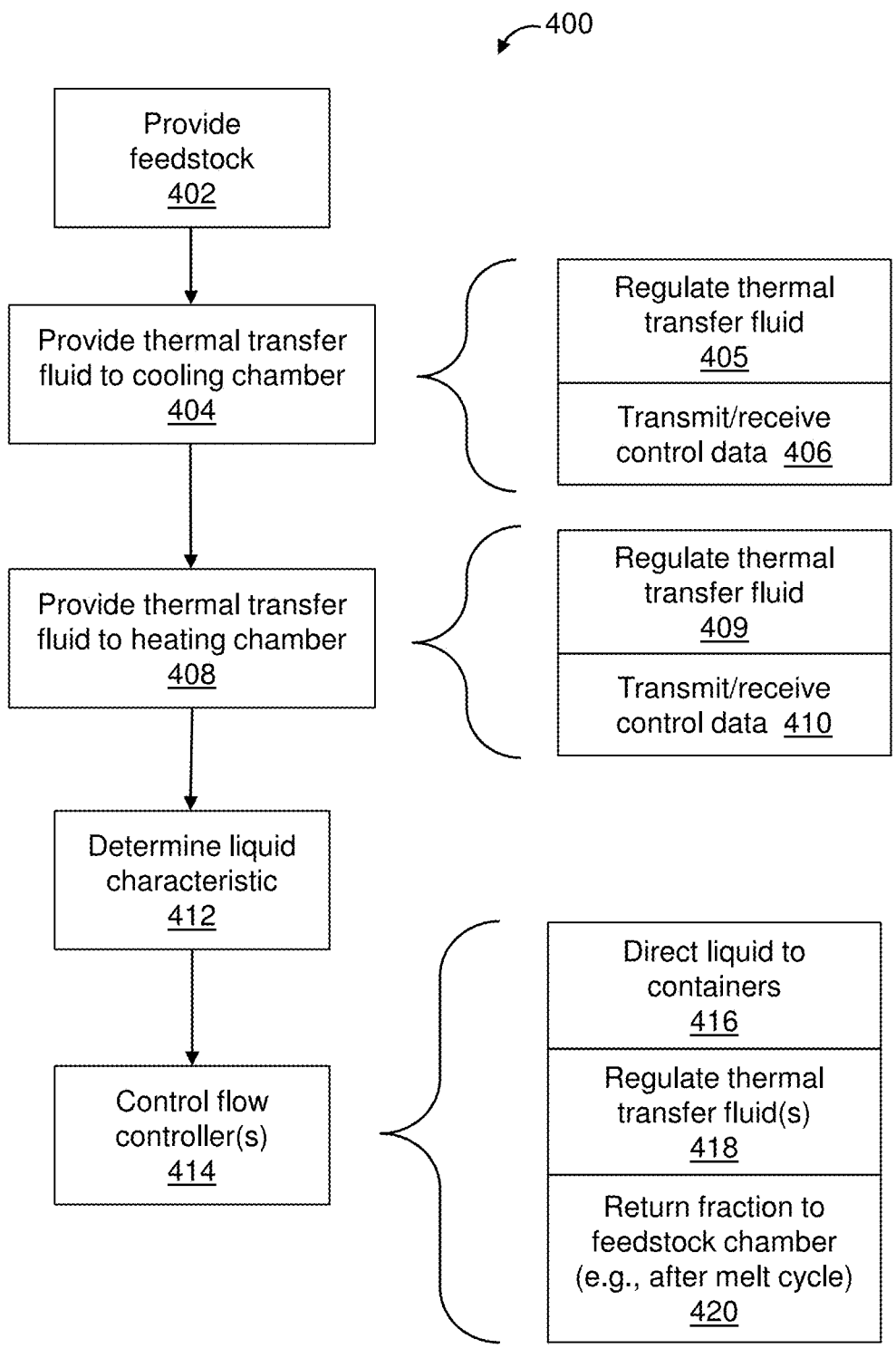
FIG. 4 is a flow diagram of a method of generating a concentrated product from a urinary feedstock in accordance with one example.

FIG. 4 depicts a method 400 of generating a concentrated product from a urinary feedstock in accordance with one example. The method 400 may be implemented by the system 100 of FIG. 1 or another system, and/or in connection with the heat exchanger assembly 202 of FIG. 2 or another heat exchanger assembly. For instance, the processor(s) of the system controller 116 shown in FIG. 1 may control a number of valves, pumps, and/or other flow control elements to implement the method 400. Alternative or additional system controllers or processors may be used to implement the method 400.

The method 400 may begin with an act 402 in which urinary feedstock is provided to a feedstock chamber. The feedstock may be provided as a liquid at ambient or another temperature.

The method 400 may include a number of acts directed to controlling a heat exchanger assembly, such as the examples of heat exchanger assemblies described above. For instance, in an act 404, thermal transfer fluid is provided to one or more thermal transfer fluid chambers to freeze the feedstock. In the example of FIG. 4, the thermal transfer fluid is provided to a cooling chamber, such as a cooling shell. Implementation of the act 404 results in the freezing (e.g., partial freezing) of the feedstock, e.g., a fraction of the feedstock, as described above. A variety of thermal transfer fluids may be used, including, for instance, glycol, water, and air. The act 404 may include regulating the temperature and/or flow of the thermal transfer fluid in an act 405. The regulation or other control of the thermal transfer fluid may be supported by one or more data communications in support of implementing an automated control system, as described above. For example, data may be transmitted to, and received from, a remote computer in an act 406. The data may be representative of one or more system parameters, including, for instance, one or more measured characteristics indicative of the solute concentration level.

After the feedstock has been frozen (e.g., partially frozen), a thermal transfer fluid is provided in an act 408 to one or more thermal transfer fluid chambers to thaw the feedstock. In the example of FIG. 4, the thermal transfer fluid is provided to a heating chamber, such as a heating shell. Implementation of the act 408 results in the thawing of the frozen portion of the feedstock, as described above. A variety of thermal transfer fluids may be used, including, for instance, glycol, water, and air. The act 408 may include regulating the temperature and/or flow of the thermal transfer fluid in an act 409. The regulation or other control of the thermal transfer fluid may again be supported by one or more data communications, including, for instance, the transmission to, and receipt from, a remote computer in an act 410.

In an act 412, one or more characteristics of the liquid are determined as the thawed feedstock exits the feedstock chamber. The liquid characteristic(s) is/are determined by one or more sensors. The liquid characteristic is indicative of the solute concentration level of the thawed feedstock. The configuration of the sensor(s) and/or the nature of the liquid characteristic may vary as described above.

The determined liquid characteristic(s) is/are then used in an act 414 to control one or more flow controllers. For instance, one or more valves, pumps, or other flow control elements of an output flow arrangement may be controlled. In the example of FIG. 4, the act 414 includes directing the thawed feedstock to one or more containers in an act 416. Alternatively or additionally, one or more valves, pumps, or other flow control elements used to regulate the flow of thermal transfer fluid(s) in an act 418. The act 414 may accordingly be directed to further control of a heat exchanger assembly or component thereof. The regulation and other control may include communications and other control procedures involving an automated control system or other remote computer, as described herein.

The act 414 may include controlling one or more additional flow controllers. For instance, one or more flow controllers may be controlled in an act 420 to return a fraction produced during the thawing of the feedstock back to the feedstock chamber. The fraction or product may be defined near the final stage of the melt or thawing cycle, such that the solute concentration of the thawed feedstock is too low for use as, e.g., fertilizer. Alternatively or additionally, one or more flow controllers may be used to remove (e.g., dump) the fraction produced in the final stage of the melt cycle.

The product may be returned to the feedstock chamber at various times. For instance, in some cases, the product may be pumped back or otherwise returned to the feedstock chamber after the melt cycle. For example, the return may occur once the melt cycle is complete, e.g., when the feedstock chamber is entirely empty. The product (or portion of the product) to be returned may be stored in one or more of the collection reservoirs until the melt cycle is complete and/or the feedstock chamber is otherwise ready to be refilled. Alternatively, the feedstock to be returned may be provided before or during the melt cycle, e.g., when the product has a relatively high solute concentration level not quite high enough for use, e.g., as fertilizer. The return product thus may or may not be provided (e.g., mixed) with new feedstock charge.

The acts of the method 400 may be implemented in an order other than that shown. For instance, the liquid characteristic determination of the act 412 may be implemented concurrently with the provision of thermal transfer fluid in the act 408 and/or the control of the flow controller(s) in the act 414. The solute concentration level may thereby be used to regulate the provision of thermal transfer fluid.

FIGS. 5-9 depict embodiments in which the feedstock is provided to multiple chambers. As described below, the embodiments involve chamber-to-chamber heat transfer in which the heat from one chamber is used to melt the frozen portion of the feedstock in one or more other chambers. The chambers are accordingly operated at a different stages or phases of the freeze/thaw cycle. The systems, devices, and methods described above may be used to control the operation and freeze/thaw cycle of each chamber. For instance, the multiple chamber embodiments described below may also implement the gradual melting and sorting of the products described above.

The chamber-to-chamber heat transfer of the embodiments described below increases the energy efficiency of the process. To reduce energy consumption, the device may include at least two chambers for freezing urine. The two chambers may be operated in an alternating batch-wise manner. While heat is being removed from one chamber to create ice, that heat is being transferred into another chamber to melt ice that was created previously. A heat pump may be used to implement this heat transfer. The heat pump may be or include a Peltier cell or a mechanical refrigeration unit. Because the actively freezing batch uses the remaining ice from the previous batch as a heat sink, the efficiency of the heat pumping process is increased relative to scenarios where heat is merely dumped to a room-temperature environment.

The embodiments described below also address removal of additional heat. Because no system is perfectly efficient, not all the heat removed from the current batch can be absorbed by the ice from the previous batch. So some amount of heat is removed by a heat dump system. In some cases, the heat dump system includes another Peltier cell that transfers heat to the surrounding air or other external heat sink. Alternatively or additionally, the heat dump system includes a circulating thermal transfer fluid that is cooled via various techniques.

The embodiments described below may implement freeze concentration via two or more freezing chambers, a chamber-to-chamber heat transfer system for moving heat out of one chamber and into another, and a heat dumping system for moving heat out of a chamber and into an external heat sink, such as ambient air or water. As described below, the heat dump system may dump heat passively, as through a radiator, or actively, as through a refrigeration device such as a Peltier cell. The heat dump system may remove heat directly from the actively freezing chamber, or it may remove heat from a different point in the heat transfer system, such as a different chamber, after that heat has previously been removed from the freezing chamber by chamber-to-chamber heat transfer system.

The freeze concentrator processes multiple batches simultaneously. The timing of the freezing and thawing phases in the different chambers are out of phase with each other, such that when one batch is thawing, another batch is freezing, and the thawing batch is used as a heat sink for the heat removed from the freezing batch. Any heat that cannot be absorbed by the melting batch, but which is to be removed in order to fully freeze the freezing batch, is removed using the heat dump system. During the period where the feedstock is freezing in any given chamber, heat may be removed by the chamber-to-chamber heat transfer system and the heat dump system simultaneously, or sequentially, or in any order or combination.

The chamber-to-chamber heat transfer system and the heat dump system may be driven by solid-state thermoelectric devices (e.g. one or more Peltier cells), vapor-compression refrigeration, or other techniques. If a solid-state thermoelectric device is used, the thermoelectric device may be connected to one or more of the freeze chambers by a solid thermally conductive material (e.g., an aluminum block), so as to transfer heat to or from the chamber by direct conductivity, or the thermoelectric device may heat and/or cool a heat transfer fluid that is then used to heat or cool a chamber.

Figure 5:
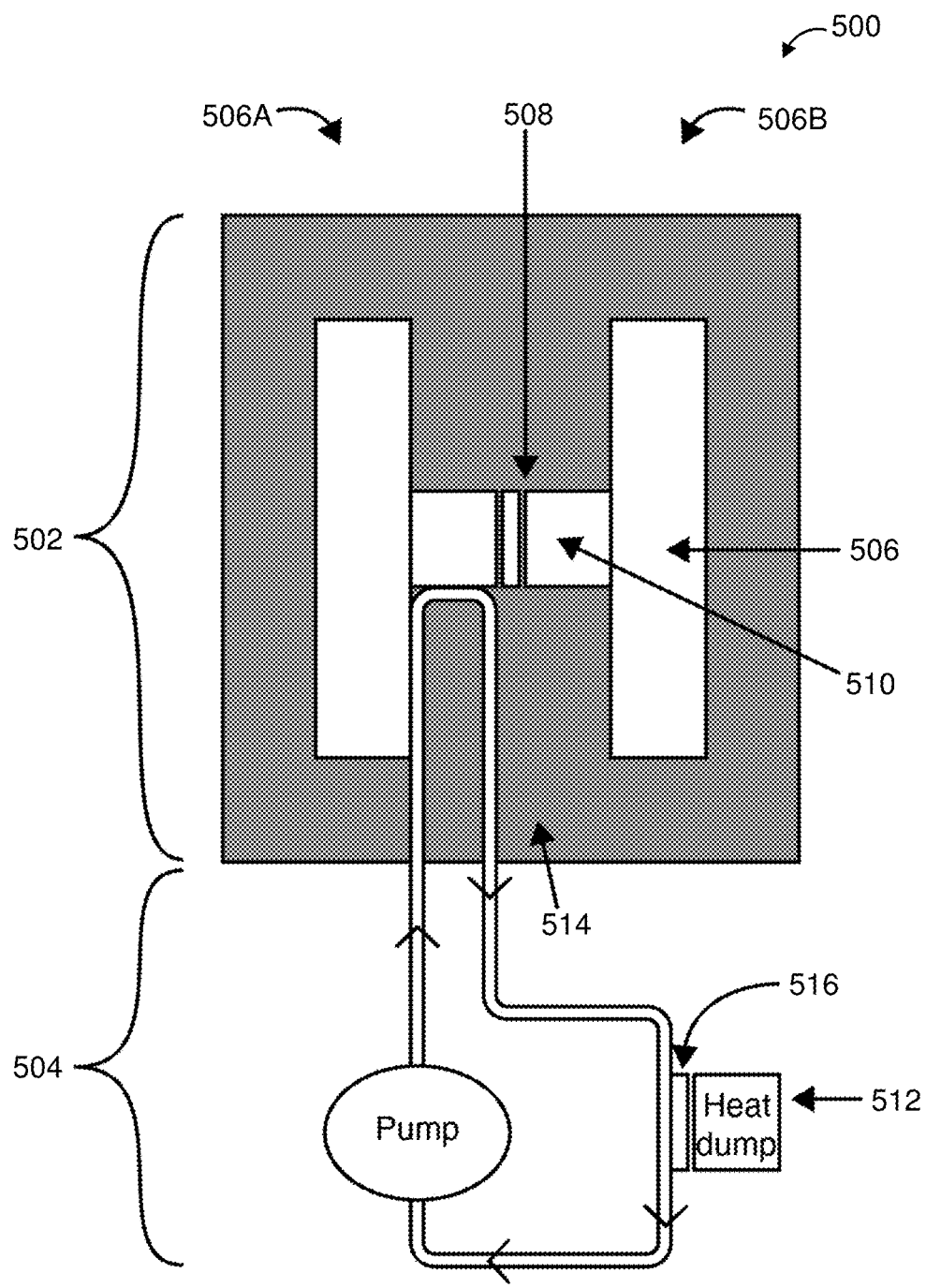
FIG. 5 is a schematic diagram of a system for generating a concentrated product from a feedstock with a reciprocating concentration system having multiple chambers in accordance with one example.

FIG. 5 depicts a system 500 for generating a concentrated product from a feedstock. The system 500 includes a reciprocating concentration system 502 and a heat dump system 504. In this example, the reciprocating concentration system 502 includes two chambers 506 (sides 506A and 506B) to which the feedstock is alternately provided and from which the concentrated product is alternately removed. The reciprocating concentration system 502 also includes a heat transfer system 508 in thermal communication with the two chambers 506. In this example, the heat transfer system 508 includes a thermoelectric heat pump, such as a Peltier cell. The freeze chambers 506 are thermally connected to two sides of the heat transfer system 508 (e.g., Peltier cell), allowing heat to be transferred conductively from one chamber 506 to the other. The heat transfer system 508 is thus configured to reversibly transfer heat between the two chambers 506 such that one chamber 506 alternates between melting a frozen portion of the feedstock in the other chamber 506 and having a frozen portion of the feedstock melted by the feedstock in the other chamber 506.

In the example of FIG. 5, the heat transfer system 508 includes two thermally conductive blocks or other members 510 (e.g., aluminum blocks) between which the Peltier cell is sandwiched. The Peltier cell develops a temperature difference between its two sides, which drives heat transfer by conductance from one chamber 506 to the other, causing ice in the chamber 506A to melt while liquid in the chamber 506B freezes. At the end of melt/freeze sequence or cycle, the events repeat, but with freezing occurring in the chamber 506 that previously thawed, and vice versa.

An example of the operation of the chamber-to-chamber heat transfer is now described. Side 506A contains frozen or partially frozen urine, and Side 506B contains liquid urine. The ice in Side 506A will melt during this sequence, and the urine in Side 506B will freeze. Sides 506A and 506B may thus be referred to as the melting and the freezing sides, respectively, in this instance of the cycle.

Liquid concentrate is drained from the melting side (Side 506A). Heat is transferred using a solid state heat pump or other refrigeration device from the freezing side (Side 506B) to the melting side (Side 506A), melting the ice on the melting side and freezing the urine on the freezing side. As more liquid drains from the melting side, it is directed to the appropriate container depending on its concentration (as described above).

All of the ice on the melting side eventually melts. Some meltwater may be retained in the melting side and cooled using the heat dump system (which provides a sink (e.g., a continuing sink) for heat removed from the freezing side), such as by circulating it through an external radiator, circulating it through an additional refrigeration device, or other means. This allows the thermoelectric device between the two chambers to continue removing remaining heat from the freezing side, in order to freeze it to the desired level. Alternatively or additionally, the melting side may be cooled using another heat-dumping method, such as by removing heat using a thermal transfer fluid that is kept in a channel separate from the inside of the freeze chamber. In either case, heat is removed from the melting side, so that the thermoelectric device between the two sides may continue to remove heat from the freezing side.

Once the freezing side is sufficiently frozen, any remaining liquid is drained from the melting side. The now-empty melting side is refilled with a new batch of urine and the process repeats, but with the sides reversed.

The heat dump system 504 is configured to remove heat from the reciprocating concentration system 502. To that end, the heat dump system 504 is in thermal communication with one or more elements of the reciprocating concentration system 502. In this example, the heat dump system 504 is in thermal communication with the heat transfer system 508. In this case, the heat dump system 504 is in thermal communication (e.g., via a thermal transfer fluid) with one of the conductive blocks 510 adjacent to the Peltier cell.

The heat dump system 504 includes a heat dump device 512 outside of insulation 514 that surrounds the reciprocating concentration system 502. In this example, the heat dump device 512 includes a heat sink and a fan. A further Peltier cell 516 may be used to transfer heat from the thermal transfer fluid to the heat sink. Other types of heat dump devices and heat dumping arrangements may be used, including, for instance, a large thermal mass and/or a radiator with a circulating fluid. In some cases, the heat dump system 504 removes heat without the use of a heat pump. For instance, the heat dump system 504 may remove heat to a cold, natural heat sink, such as cold ambient air, soil, or outer space.

Figure 6:
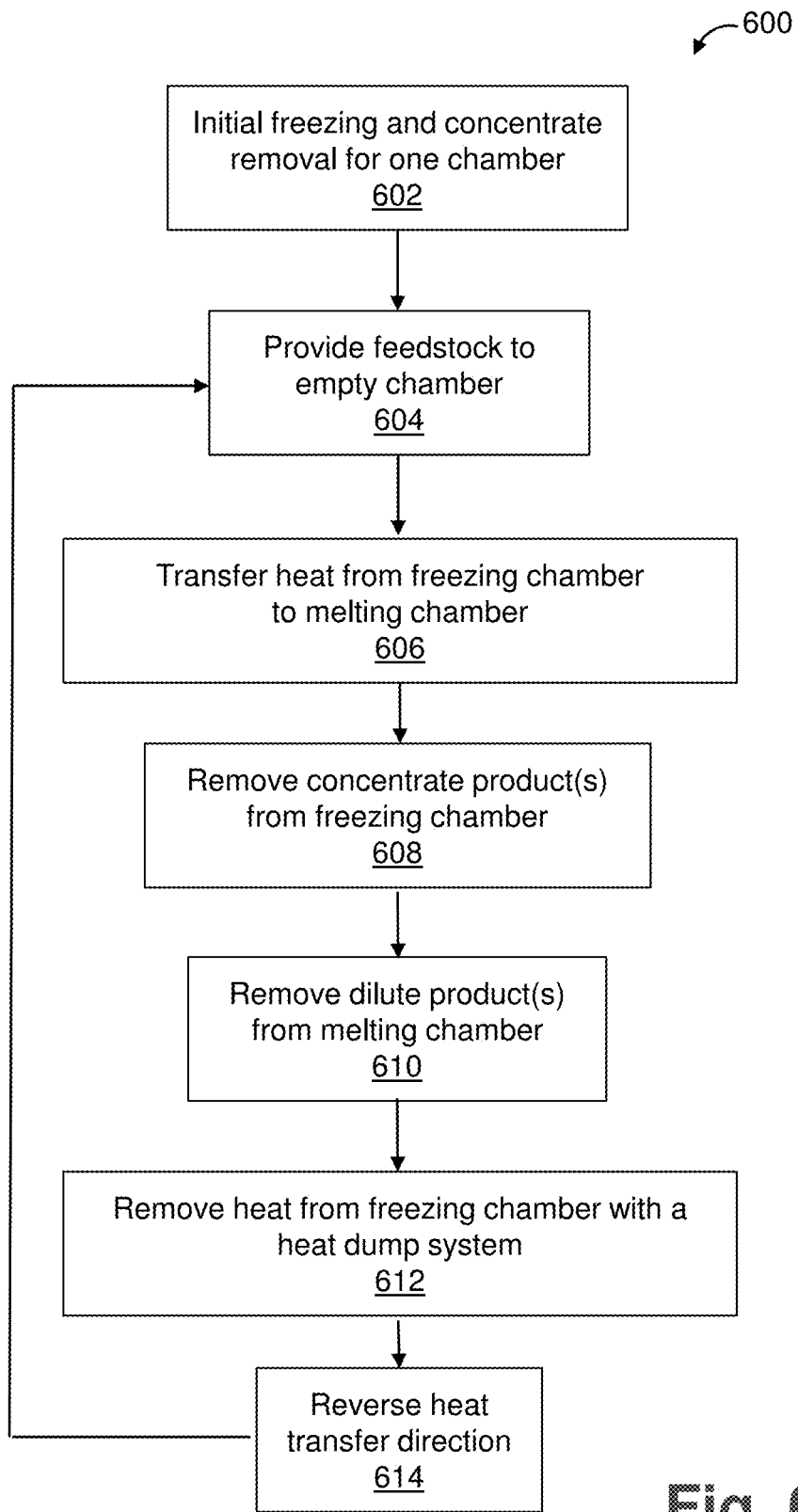
FIG. 6 is a flow diagram of a method of generating a concentrated product from a feedstock with a reciprocating concentration system having multiple chambers in accordance with one example.

FIG. 6 depicts a freeze concentration method 600 involving chamber-to-chamber heat transfer in accordance with one example. The method 600 may be implemented by the system of FIG. 5 or another system. Implementation of the method 600 may be controlled via one or more processors, including, for instance, the processor(s) of the system controller 116 shown in FIG. 1. Alternative or additional system controllers or processors may be used to implement the method 600.

The method 600 may begin with one or more acts directed to initializing the system. In the example of FIG. 6, the method 600 includes an act 602 in which feedstock in one of the chambers is frozen and concentrated product is removed. After such or other initialization, the method 600 includes a number of acts that are repeated as described below.

The feedstock is provided to a first, empty chamber of a reciprocating concentration system in an act 604. The empty chamber is thus filled with liquid feedstock soon to be frozen.

In an act 606, heat is transferred, with a heat transfer system of the reciprocating concentration system, from the now-filled first chamber to a second chamber of the reciprocating concentration system. The heat transfer melts a frozen portion of the feedstock in the second chamber and freezes the feedstock in the first chamber. The heat transfer system may be in thermal communication with the first and second chambers as described herein. The heat transfer of the act 606 may continue during one or more of the following acts, such as acts 608 and 610.

In an act 608, concentrated product is removed from the second chamber as the frozen portion of the feedstock in the second chamber starts to thaw. A number of concentrated products may be removed as described herein. Eventually, the concentration level drops to a level such that one or more dilute products are removed from the second chamber in an act 610.

Heat is removed from the reciprocating concentration system in an act 612 with a heat dump system in thermal communication with the reciprocating concentration system. In this manner, further heat may be removed the first chamber (i.e., the chamber in the process of freezing) despite the removal of most or all of the product from the second chamber. The act 612 may be implemented before, during, or after any of the other acts of the method 600. For instance, the act 608 may be implemented before heat is transferred between the chambers in the act 606.

A heat transfer direction of the heat transfer system is then switched in an act 614 to reverse operation of the reciprocating concentration system in preparation for additional feedstock to be provided to the second chamber. Control then may then return to the act 604 as shown.

The acts of the method 600 may be implemented in an order other than that shown. For instance, heat may be continuously removed by the heat dump system. The act 608 may thus be implemented at any time during the method 600.

Additional, alternative or fewer acts may be implemented. For instance, the method 600 may include an act directed to removing any remaining liquid products from the melting chamber, which may be useful in cases in which one of the dilute products (e.g., the most dilute product) is used as a thermal transfer fluid.

Figure 7:
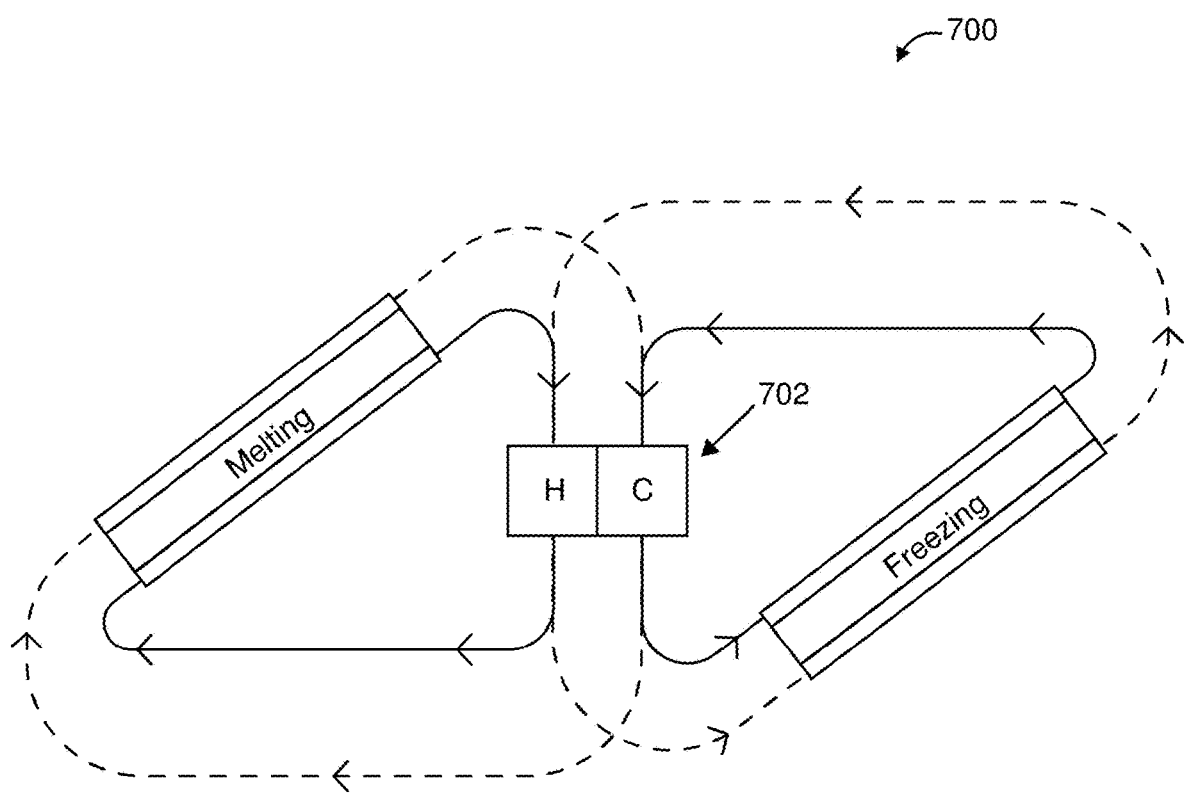
FIG. 7 is a schematic diagram of a reciprocating concentration system having a thermoelectric heat pump and thermal fluid channels for thermal transfer in accordance with one example.

FIG. 7 depicts an example of a reciprocating concentration system 700 in which the freeze concentration chambers exchange heat via a circulating thermal transfer fluid, rather than by direct conductance. The driver of this heat transfer may be any type of heat pump 702, such as one or more Peltier cells, or a mechanical refrigeration unit. In this example, the path of the thermal transfer fluid changes in accordance with which side is melting or freezing. Solid lines indicate active thermal transfer fluid channels. Dashed lines indicate inactive thermal transfer fluid channels. A number of valves may be included to switch between the channels. The direction of heat flow between the two sides of the freeze concentrator may be controlled in alternative ways. For instance, the direction of heat flow between the two sides of the freeze concentrator may be reversed by reversing the action of the heat pump, e.g., by reversing the polarity of a Peltier cell.

In the example of FIG. 7, the heat transfer system 700 includes cooling and warming shells adjacent each of the two chambers. Each of the cooling and warming shells carries a respective thermal transfer fluid. The cooling shell may be disposed along a respective upper portion (e.g., a top or upper side) of the first and second chambers, as shown, such that the feedstock freezes from the upper portion downward. The warming shell may be disposed along a respective lower portion (e.g., a bottom or lower side) of the first and second chambers, as shown, such that the feedstock melts from the lower portion upward.

The reciprocating concentration system 700 of FIG. 7 may be combined with any of the heat dump systems described herein to remove heat therefrom.

The configuration of the reciprocating concentration system 700 with a circulating thermal transfer fluid may vary from the example shown in FIG. 7. For instance, the number of shells may vary. For example, in some cases, only a single shell is provided for each chamber. The single shell serves as both a warming shell and a cooling shell depending on the phase of operation.

Figure 8:
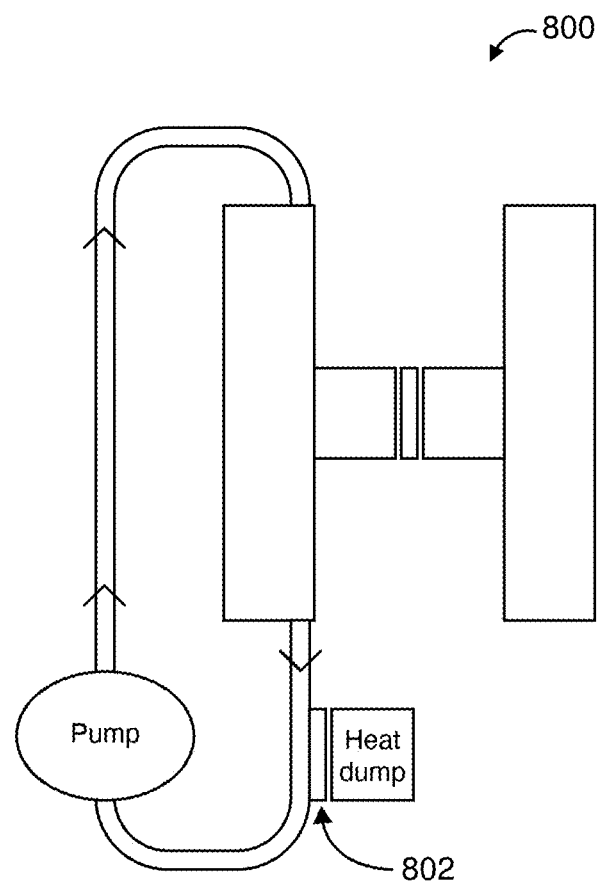
FIG. 8 is a schematic diagram of a system for generating a concentrated product having a heat dump system in thermal communication with one or more chambers in accordance with one example.

FIG. 8 depicts a reciprocating concentration system 800 with a heat dump system in thermal communication with one or more chambers in accordance with one example. In this case, the heat dump system circulates a fluid through one of the chambers (e.g., the freezing chamber) to remove the heat from the reciprocating concentration system. The heat dump system may include another fluid transfer channel for circulating the fluid through the other chamber.

The heat dump system may include a Peltier cell 802 and a heat dump device external to the reciprocating concentration system as described herein. The configuration of the heat dump device may vary as described herein.

Any number of chambers may be included. Multiple chambers may be operated on the same phase of the freeze/thaw cycle (i.e. at the same stage of freezing or thawing at the same time). Alternatively or additionally, multiple chambers may be operated at respective phases of the freeze/thaw cycle (e.g., one or more chamber melting, one or more freezing, and one or more chilling but not yet freezing). In such cases, a thermal transfer fluid may be directed by an array of pumps and/or valves such that heat is moved from one chamber to another by the chamber-to-chamber heat transfer system, and dumped to an external heat sink by the heat dump system.

The term "urinary feedstock" is used herein in a broad sense to include various types of urine and urine-based feedstocks. A urinary feedstock may include a feedstock including urine and/or urine-based products. A urinary feedstock may also include non-urine components. For instance, the urinary feedstock may include one or more additives, such as acid or flushwater. Alternatively or additionally, the urinary feedstock may be derived from urine after one or more pretreatments. In some cases, the pretreatment(s) may be biological in nature. In other cases, the pretreatment may include a non-biological process, such as reverse osmosis. The pretreatment(s) may alter the urine in various ways, including, for instance, partial concentration.

Although described in connection with human urine feedstocks and fertilizer products, the disclosed systems and methods are useful with a wide variety of urinary feedstocks. The systems and methods may be applied to other urine feedstocks. The systems and methods may be used to generate non-fertilizer products. The disclosed systems and methods may be useful in a wide variety of applications, including applications not involving urinary feedstocks. For example, the disclosed systems and methods may be used to process other waste feedstocks, such as centrate from a wastewater plant or leachate from a composting toilet, or non-waste feedstocks like foods or pharmaceuticals.

The present disclosure has been described with reference to specific examples that are intended to be illustrative only and not to be limiting of the disclosure. Changes, additions and/or deletions may be made to the examples without departing from the spirit and scope of the disclosure.

The foregoing description is given for clearness of understanding only, and no unnecessary limitations should be understood therefrom.

What is claimed is:

1. A system for generating a concentrated product from a feedstock, the system comprising:
   a reciprocating concentration system comprising:
      first and second chambers to which the feedstock is alternately provided and from which the concentrated product is alternately removed; and
      a heat transfer system in thermal communication with the first and second chambers, the heat transfer system being configured to reversibly transfer heat between the first and second chambers such that the first chamber alternates between melting a frozen portion of the feedstock in the second chamber and having a frozen portion of the feedstock in the first chamber melted by the feedstock in the second chamber; and
   a heat dump system in thermal communication with the reciprocating concentration system, the heat dump system being configured to remove heat from the reciprocating concentration system;
   wherein the heat dump system comprises a thermoelectric heat pump and a heat sink in thermal communication with the thermoelectric heat pump.

2. The system of claim 1, wherein the heat dump system is in thermal communication with one of the first and second chambers or in alternating thermal communication with both of the first and second chambers.

3. The system of claim 1, wherein the heat dump system is in thermal communication with the heat transfer system.

4. A system for generating a concentrated product from a feedstock, the system comprising:
   a reciprocating concentration system comprising:
      first and second chambers to which the feedstock is alternately provided and from which the concentrated product is alternately removed; and
      a heat transfer system in thermal communication with the first and second chambers, the heat transfer system being configured to reversibly transfer heat between the first and second chambers such that the first chamber alternates between melting a frozen portion of the feedstock in the second chamber and having a frozen portion of the feedstock in the first chamber melted by the feedstock in the second chamber; and
   a heat dump system in thermal communication with the reciprocating concentration system, the heat dump system being configured to remove heat from the reciprocating concentration system;
   wherein the heat transfer system comprises a heat pump.

5. The system of claim 4, wherein:
   the heat pump is disposed between the first and second chambers; and
   the heat transfer system further comprises cooling and warming shells adjacent the first and second chambers, each of the cooling and warming shells carrying a respective thermal transfer fluid.

6. The system of claim 5, wherein:
   the cooling shell is disposed along a respective upper portion of the first and second chambers such that the feedstock freezes from the upper portion downward; and
   the warming shell is disposed along a respective lower portion of the first and second chambers such that the feedstock melts from the lower portion upward.

7. The system of claim 4, wherein the heat transfer system further comprises first and second pairs of thermal transfer channels in thermal communication with the first and second chambers, respectively, each thermal transfer channel passing through the heat pump.

8. The system of claim 4, wherein the heat pump comprises a thermoelectric heat pump.

9. A system for generating a concentrated product from a feedstock, the system comprising:
   a reciprocating concentration system comprising:
      first and second chambers to which the feedstock is alternately provided and from which the concentrated product is alternately removed; and
      a heat transfer system in thermal communication with the first and second chambers, the heat transfer system being configured to reversibly transfer heat between the first and second chambers such that the first chamber alternates between melting a frozen portion of the feedstock in the second chamber and having a frozen portion of the feedstock in the first chamber melted by the feedstock in the second chamber;
   a heat dump system in thermal communication with the reciprocating concentration system, the heat dump system being configured to remove heat from the reciprocating concentration system; and
   insulation disposed between a heat sink of the heat dump system and the reciprocating concentration system.

10. A system for generating a concentrated product from a feedstock, the system comprising:
    a reciprocating concentration system comprising:
       first and second chambers to which the feedstock is alternately provided and from which the concentrated product is alternately removed; and
       a heat transfer system in thermal communication with the first and second chambers, the heat transfer system being configured to reversibly transfer heat between the first and second chambers such that the first chamber alternates between melting a frozen portion of the feedstock in the second chamber and having a frozen portion of the feedstock in the first chamber melted by the feedstock in the second chamber; and a heat dump system in thermal communication with the reciprocating concentration system, the heat dump system being configured to remove heat from the reciprocating concentration system;

wherein the heat transfer system comprises:

first and second thermally conductive blocks adjacent to the first and second chambers, respectively; and a Peltier cell disposed between the first and second thermally conductive blocks.

11. A system for generating a concentrated product from a feedstock, the system comprising:

a reciprocating concentration system comprising:

first and second chambers to which the feedstock is alternately provided and from which the concentrated product is alternately removed; and a heat transfer system in thermal communication with the first and second chambers, the heat transfer system being configured to reversibly transfer heat between the first and second chambers such that the first chamber alternates between melting a frozen portion of the feedstock in the second chamber and having a frozen portion of the feedstock in the first chamber melted by the feedstock in the second chamber; and a heat dump system in thermal communication with the reciprocating concentration system, the heat dump system being configured to remove heat from the reciprocating concentration system;

wherein the first and second chambers are disposed in an inclined orientation.

12. A system for generating a concentrated product from a feedstock, the system comprising:

a reciprocating concentration system comprising:

first and second chambers to which the feedstock is alternately provided and from which the concentrated product is alternately removed; and a heat transfer system in thermal communication with the first and second chambers, the heat transfer system being configured to reversibly transfer heat between the first and second chambers such that the first chamber alternates between melting a frozen portion of the feedstock in the second chamber and having a frozen portion of the feedstock in the first chamber melted by the feedstock in the second chamber; and a heat dump system in thermal communication with the reciprocating concentration system, the heat dump system being configured to remove heat from the reciprocating concentration system;

wherein:

the reciprocating concentration system further comprises a third chamber to which the feedstock is provided and from which the concentrated product is removed; and the heat transfer system in thermal communication with the third chamber such that the feedstock in the third chamber melts and freezes out of phase relative to both the first and second chambers.

* * * * *